UNITED STATES PATENT OFFICE.

VIRGINIA J. WATTS, OF BALTIMORE, MARYLAND.

ORNAMENTING ARTIFICIAL MARBLE.

SPECIFICATION forming part of Letters Patent No. 251,327, dated December 20, 1881.

Application filed November 1, 1881. (No specimens.)

*To all whom it may concern:*

Be it known that I, VIRGINIA J. WATTS, of Baltimore, in the county of Baltimore, and in the State of Maryland, have invented certain new and useful Improvements in Ornamenting Artificial Marble; and I do hereby declare that the following is a full, clear, and exact description thereof.

This invention relates to an improved process of producing ornamental surfaces on artificial marble or stone; and it has for its object to provide an improved means whereby designs may be formed on the face of the slab during the process of construction, as more fully hereinafter set forth.

In carrying out my invention I form a composition by boiling ten pounds of rice or other starchy or farinaceous material with a sufficient quantity of water to the consistency of paste and adding to the paste two quarts of gum-turpentine and three pounds of white shellac dissolved in alcohol, and five pounds of sulphate of soda, one quart of liquid glass, and five pounds of carbonate of ammonia dissolved in water. To this composition is added forty gallons of water, after which Keen's or other hydraulic cement is added in a dry state, and the whole mixed and brought to a plastic state. I then take a sheet of glass or other material having a smooth surface, and I dip sheets of lace of any suitable design into a suitable quantity of the above composition, which may be colored as may be desired. After this I place the lace sheet on the surface of the glass, allow it to remain a few moments, then gently remove it. I then place a suitable frame upon the prepared face of the glass and fill in with the plastic mass, and when set and hardened the slab formed is removed having the designs embedded in its face. The surface bearing the designs is then polished in the usual manner, completing the slab.

In some instances the designs may be placed below the sheet of glass and the lines traced on the face in the composition, suitably colored, and the slab is finished as before.

My invention can be employed in all plastic artificial stone-work, and for architectural and other purpose where iron, wood, and natural stone have heretofore been used.

Having thus described my invention, what I claim, and desire to secure by Letters Patent, is—

The process herein described of ornamenting the surfaces of artificial marble by imprinting designs from a textile fabric in suitable composition and then forming the slab upon such surface, substantially as specified.

In testimony whereof I affix my signature, in presence of two witnesses, this 1st day of November, 1881.

VIRGINIA J. WATTS.

Witnesses:
C. M. ALEXANDER,
H. J. ENNIS.